April 17, 1934.  A. R. SCHWARZKOPF  1,954,833
HOUSING FOR ELECTRIC MOTORS
Filed April 21, 1932
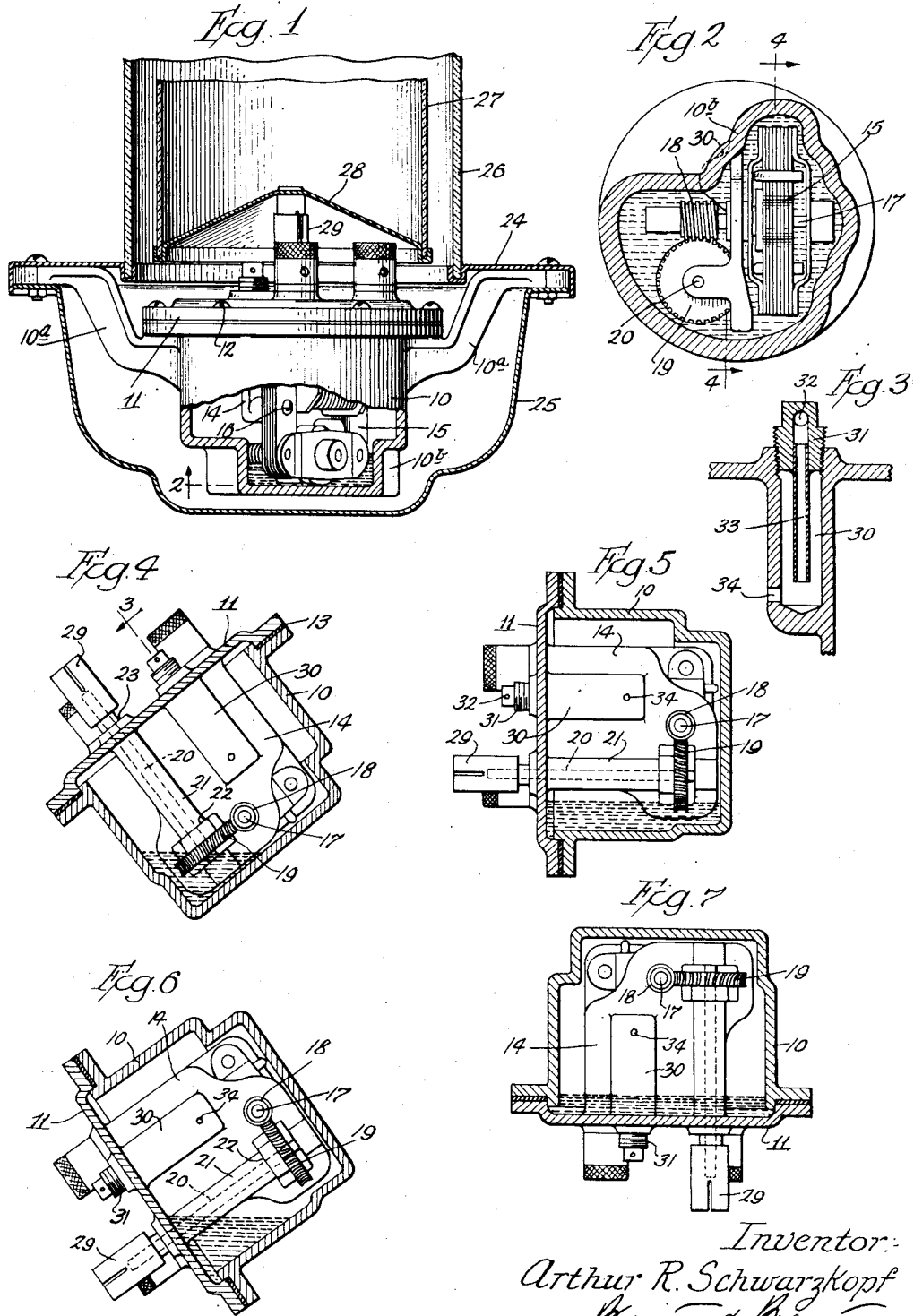
Inventor:
Arthur R. Schwarzkopf Patented Apr. 17, 1934

1,954,833

UNITED STATES PATENT OFFICE 1,954,833

HOUSING FOR ELECTRIC MOTORS

Arthur R. Schwarzkopf, Chicago, Ill., assignor to Theo. A. Kochs Company, Chicago, Ill., a corporation of Illinois Application April 21, 1932, Serial No. 606,534

6 Claims. (Cl. 172—36)

Certain types of motors, such as induction motors, are adapted to run in a bath of oil without injury to the motor, and it is desirable that for certain classes of work, such as for driving rotatable signs, barber poles, and the like, where the parts are inaccessible, that motors of this type together with their reduction gearing should be equipped to run in oil in order to insure proper lubrication.

This class of equipment is usually in the hands of persons having very little mechanical skill, and consequently equipment of this kind should be designed to run for long periods without the addition of any lubricant whatever. It is desirable, therefore, that there be no occasion for accompanying instructions regarding addition of oil to the motor at the time the equipment is installed and set in operation.

It is an object of this invention, therefore, to provide adequate means for oiling such a motor so that a sufficient amount of oil may be supplied to the motor before it leaves the factory, the parts being so made, however, that none of the oil thus supplied can leak out in transit no matter in what position the motor and its housing may be placed.

This and other objects, as will hereinafter appear, are accomplished by this invention which is fully described in the following specification and shown in the accompanying drawing, in which—

Figure 1 is a partial vertical section through the lower portion of a barber pole equipped with a motor and motor housing embodying this invention;

Fig. 2 is a horizontal section on the line 2 of Fig. 1;

Fig. 3 is a partial vertical section on the line 3 of Fig. 4; and

Figs. 4, 5, 6 and 7 are vertical sections taken on the broken line of Fig. 2 showing the motor and housing in various positions to illustrate the oil levels with respect to the oil outlets from the housing in the several positions.

The embodiment illustrated comprises a motor housing 10 having an oil-tight cover 11 secured thereon by means of screws 12 with a suitable cork gasket, or the like 13. The cover has a depending arm 14 to which is secured a motor 15, which may be of the induction type, by means of screws 16. This motor has a shaft 17 which carries a worm 18 driving a worm wheel 19 on a shaft 20, the latter being provided with a long unbroken journal 21 which extends from a point 22 adjacent the hub of the worm wheel to a point 23 on the outside of the cover 11.

The motor housing, as illustrated, is provided with supporting arms 10$^a$ which are adapted to be secured to a flanged member 24 which forms part of the support of a barber pole, the motor housing being enclosed within a sheet metal casing 25. The flanged member carries a glass cylinder 26 which encloses a paper drum 27, the outer surface of which is provided with spiral striping in colors as is common in barber poles of this type. This drum is supported at the bottom on a conical member 28 which is carried on an extension 29 of the shaft 20 so that the drum is rotated by this shaft.

It will thus be seen from Fig. 1 that the motor parts are very inaccessible for the purpose of lubrication. It is desirable, therefore, that the motor shall be supplied with oil sufficient to last it for a period of months or even years should no new oil be added. To do this, however, would require that the casing 10 be supplied with considerable oil. Enough oil for this purpose could be supplied to the motor housing before leaving the factory, providing this housing were always maintained in the upright position of Fig. 1. If it were to be laid on its side, as shown in Fig. 5, with this housing half full of oil, much of the oil would run out along the shaft 20 and would soak and ruin the drum 27, which is usually made of paper. This invention is intended to overcome this difficulty by providing means whereby the parts needing lubrication can be supplied with sufficient oil to serve that purpose before the device leaves the factory, but with substantially no chance that the oil so supplied will leak out in transit no matter what position the device may assume.

To accomplish this it will be noted that the motor and the gearing are placed very low in the housing 10 and at its bottom part 10$^b$, this housing, as illustrated in Figs. 1 and 2, closely surrounds the motor and gearing so that a relatively small amount of oil will extend well up into the motor and gearing when the device is in a normal vertical position. Should the housing, however, be tipped into some other position, as shown in Figs. 4 to 7, this oil will not reach up to the lower end 22 of the shaft bearing, and consequently none of this oil can run out of the motor housing along the shaft 20.

The amount of oil thus supplied at the factory is adequate for a period of prolonged service to furnish the necessary lubrication to the motor and gearing. As part of my invention, I provide the cover 11 with a depending well 30 which is closed at the top by means of a plug 31 having an opening 32 therein connected to a pipe 33 which extends nearly to the bottom of the well 30. When the plug 31 is removed, oil may be supplied through the well to the motor housing. The pipe 33 acts as a breather to permit expansion and contraction of air within the housing without any disturbance of the oil therein even though the oil level be above the lower end 22 of the bearing. What has been said relative to oil passing out along the shaft 20 applies also to the pipe 33, the lower end of which, however, is nearer the center of the housing 10.

Thus it will be seen that by placing the motor and gearing in what is normally the bottom of the motor housing and forming the contour of the housing walls at this point to closely surround these parts, an oil level may be supplied which is sufficiently high to bathe the moving parts with oil therein withal insufficient to reach any outlet from this housing when the same is tilted to a position out of normal. By this arrangement sufficient lubrication is insured with no danger of oil running out of the housing.

While I have shown and described but a single embodiment of my invention, it is to be understood that it is capable of many modifications. Changes, therefore, in the construction and arrangement may be made which do not depart from the spirit and scope of the invention as disclosed in the appended claims.

I claim:

1. In combination, an electric motor, a housing for the same, a shaft driven by the motor through gears located near the bottom of the housing, said shaft extending through the top of the housing, the bearing for this shaft being integral with the top of the housing and extending imperforate to a point near the middle of the housing, the bottom of the housing being narrowed about said gears so as to maintain a predetermined oil level for the gears with only a small amount of oil in the housing which will be insufficient to reach the end of the shaft bearing in any position of the housing.

2. In combination, an electric motor, a housing for the same, a shaft driven by the motor through gears located near the bottom of the housing, said shaft extending through the top of the housing, the bearing for this shaft being integral with the top of the housing and extending imperforate to a point near the middle of the housing, a filler tube extending from the top of the housing imperforate to a point near the middle of the housing, the bottom of the housing being narrowed about said gears so as to maintain a predetermined oil level for the gears with only a small amount of oil in the housing which will be insufficient to reach either the end of the shaft bearing or the filler tube in any position of the housing.

3. In combination, an electric motor adapted to run in oil, a housing for the motor, a shaft geared to the motor and extending through the housing and journaled in a bearing therein, a well extending into the housing and having an opening to the atmosphere, said well and bearing opening into the housing at points near its center, the motor and gearing being located near the bottom of the housing, said housing closely surrounding the motor and gearing whereby a small body of oil will contact the motor shaft and gearing when the same are in normal position but will not reach the opening into the well or bearing in any position of the housing.

4. In combination, an electric motor adapted to run in oil, a housing for the motor, a shaft geared to the motor and extending through the housing and journaled in a bearing therein, a well extending into the housing and having an opening to the atmosphere, said well and bearing opening into the housing at points near its center, the motor and gearing being located near the bottom of the housing whereby a small body of oil sufficient to lubricate the shaft and gearing will contact the same but will not reach the opening into the well or bearing in any position of the housing.

5. In combination, a housing and an electric motor supported therein, the motor having a horizontal driving shaft close to the housing bottom geared to a vertical driven shaft, and a closure over the housing top in sealed relation therewith, said closure having a bearing extending to a point near the middle of the housing through which the vertical shaft is extended, the housing walls in the region surrounding the horizontal driving shaft and gear connection with the vertical shaft being disposed close to the adjacent motor parts whereby to reduce the clearance therearound such as to accommodate only a small volume of oil the level of which, while sufficient to bathe the horizontal shaft and its gear connection with the vertical shaft, need not rise to a point at which it may escape through the closure around the vertical shaft in any tilted position of the housing and motor.

6. In combination, a housing and an electric motor supported therein with its driving shaft horizontally disposed close to the housing bottom, a closure over the housing top in sealed relation therewith, and a breather conduit extended above the closure and depending therefrom into the housing in spaced relation to the walls thereof, and terminating appreciably above the bottom of the housing whose walls in the region of the motor shaft are so spaced as to define a well for oil in an amount sufficient to bathe the motor shaft without entering into the breather conduit in any tilted position of the housing and motor.

ARTHUR R. SCHWARZKOPF.